Aug. 18, 1925. 1,549,927
J. A. SHERRY
AMUSEMENT DEVICE
Filed Feb. 2, 1924 5 Sheets-Sheet 1

Inventor
J. A. Sherry

Aug. 18, 1925.

J. A. SHERRY

AMUSEMENT DEVICE

Filed Feb. 2, 1924

J. A. Sherry
Inventor

By C A Snow & Co.
Attorneys

Aug. 18, 1925.

J. A. SHERRY

AMUSEMENT DEVICE

Filed Feb. 2, 1924

Inventor
J. A. Sherry
By C. A. Snow & Co.
Attorney

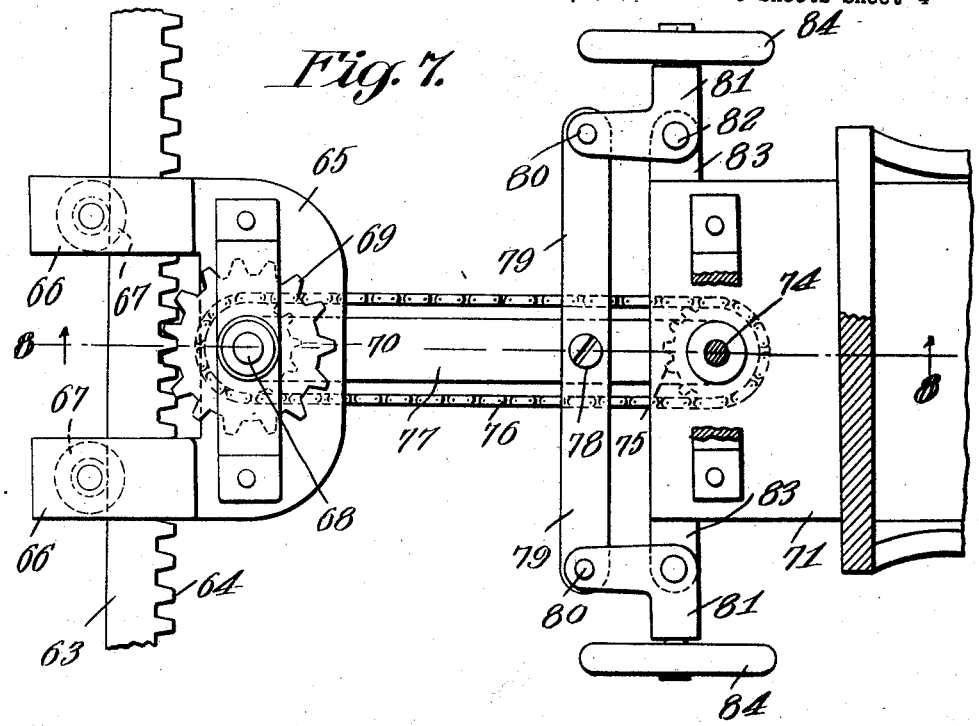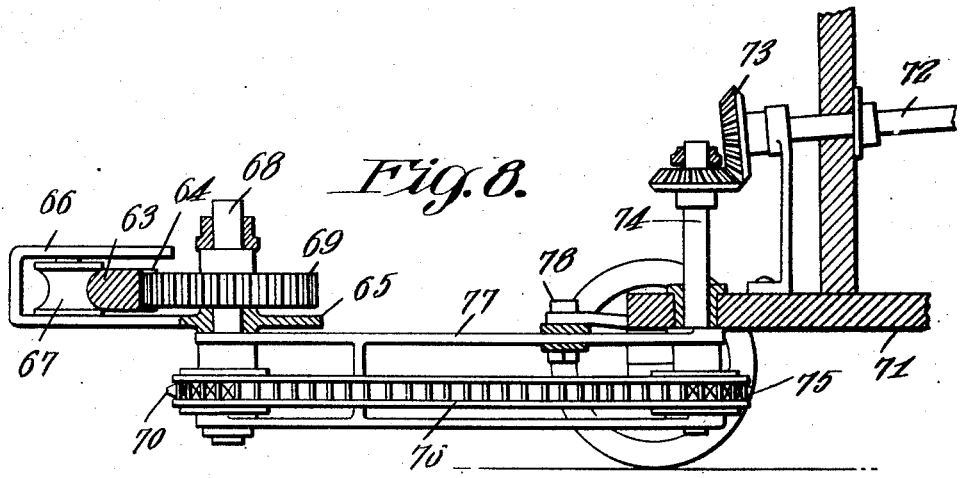

Aug. 18, 1925.  1,549,927

J. A. SHERRY

AMUSEMENT DEVICE

Filed Feb. 2, 1924  5 Sheets-Sheet 5

Inventor
J. A. Sherry
By C. A. Snow & Co.
Attorneys

Patented Aug. 18, 1925.

1,549,927

UNITED STATES PATENT OFFICE.

JAMES A. SHERRY, OF FALL RIVER, MASSACHUSETTS.

AMUSEMENT DEVICE.

Application filed February 2, 1924. Serial No. 690,327.

*To all whom it may concern:*

Be it known that I, JAMES A. SHERRY, subject of the King of England, residing at Fall River, in the county of Bristol and State of Massachusetts, have invented a new and useful Amusement Device, of which the following is a specification.

This invention is an amusement device embodying a rotary member or turntable and vehicles having movement radially of the rotary member, the vehicles being adapted to move, in an orbit, with the rotary member, on a platform or track, and one object of the invention is to provide means whereby the occupant of the vehicle may secure and control the radial movement of the vehicle as the vehicle traverses the track or platform. Another object of the invention is to provide novel means whereby the distance between the vehicle and the center of rotation of the rotary member may be changed at the will of an operator, thereby to cause the vehicle to move in an orbit at different speeds.

It is within the province of the disclosure to improve generally, and to enhance the utility of, devices of that sort to which the invention appertains.

Although preferred forms have been shown, a mechanic working within the scope of what is claimed, may make changes without departing from the spirit of the invention.

In the drawings:—

Figure 7 is a plan showing a modification;

Figure 8 is a section on the line 8—8 of Figure 7;

Figure 1:
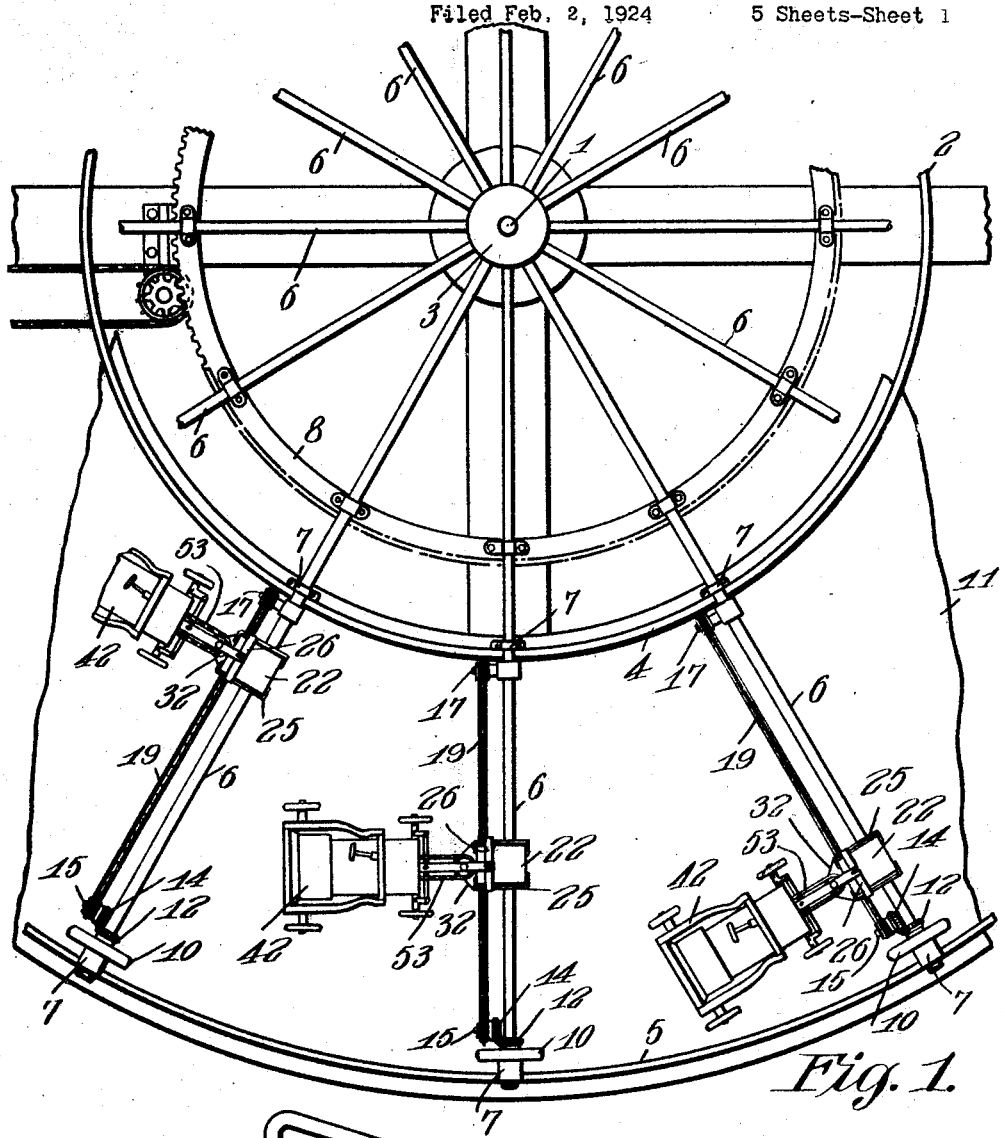
Figure 1 shows in plan, a device constructed in accordance with the invention.
Figure 11:
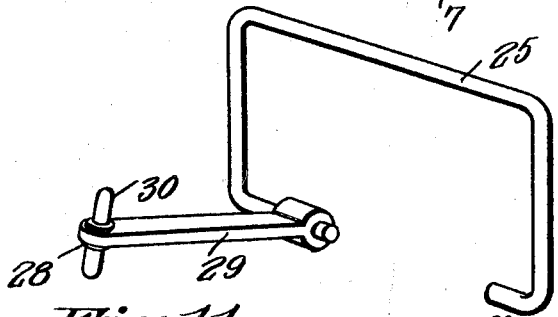
Figure 11 is a perspective disclosing the dog and attendant parts, used in the form shown in Figures 1 to 6.

Referring to Figures 1 to 6, and 11, there is shown a post 1 on which a rotary member 2 is mounted to turn horizontally, the rotary member comprising a hub 3, carried by the post 1 for rotation, an inner ring 4, an outer ring 5, and spokes or arms 6 secured at 7 to the rings. Any suitable means 8 may be provided for rotating the member 2 in a horizontal plane with the post 1 as a center. The arms 6 carry wheels 10 adapted to roll along an annular platform or track 11 disposed below the rotary member 2. The wheels 10 carry beveled pinions 12 meshing with beveled pinions 14 journaled on stub shafts 15 carried by the arms 6. Sprocket wheels 16 are connected to the pinions 14, to rotate therewith. Stub shafts 17 are mounted on the arms 6 and are disposed adjacent to the inner ring 4 of the rotary member 2, sprocket wheels 18 being rotatable on the shaft 17, and sprocket chains 19 being engaged with the sprocket wheels 18 and 16. Upstanding shifting members 20 are mounted on the arms 6 adjacent to the outer ends of the arms, and similar shifting members 21 are mounted on the arms, adjacent to the inner ring 4, the shifting member being disposed between the stub shafts 15 and 17 which project from the arms 6.

Figure 2:
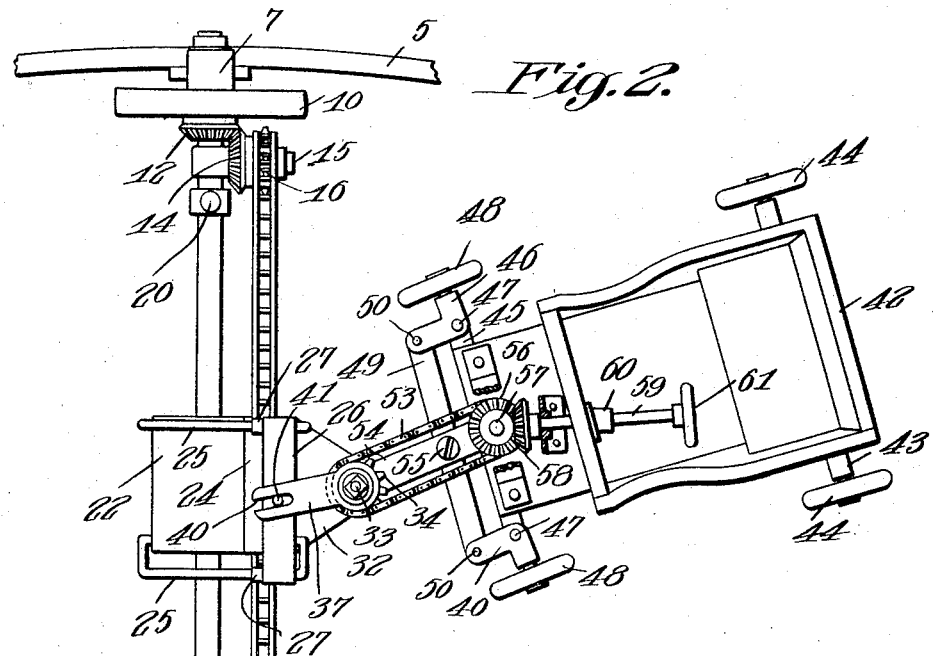
Figure 2 is a top plan showing one of the arms of the rotary member, the vehicle, and attendant parts.
Figure 3:
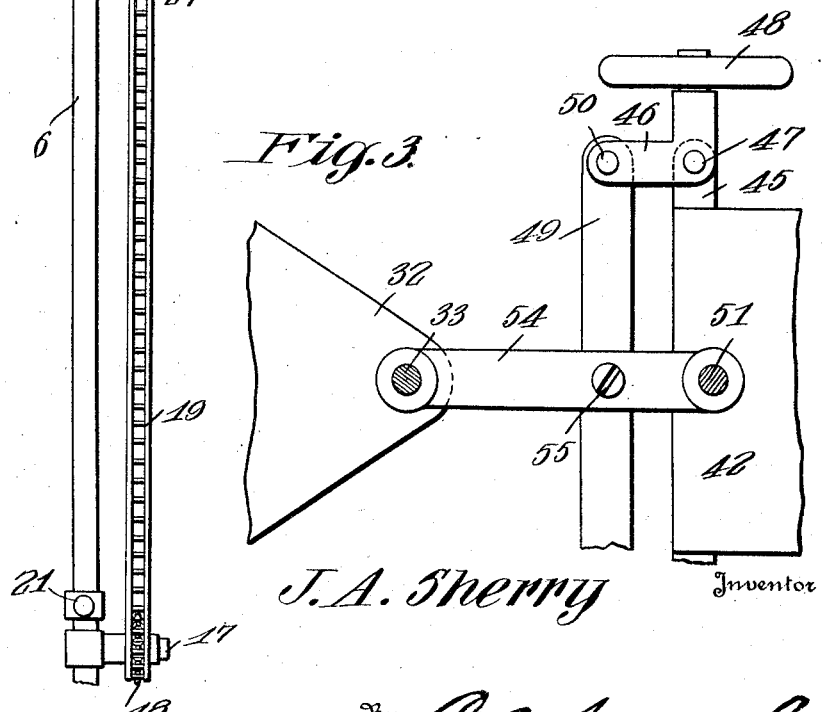
Figure 3 is a sectional view wherein the vehicle and the carriage appear in bottom plan, parts being broken away.
Figure 4:
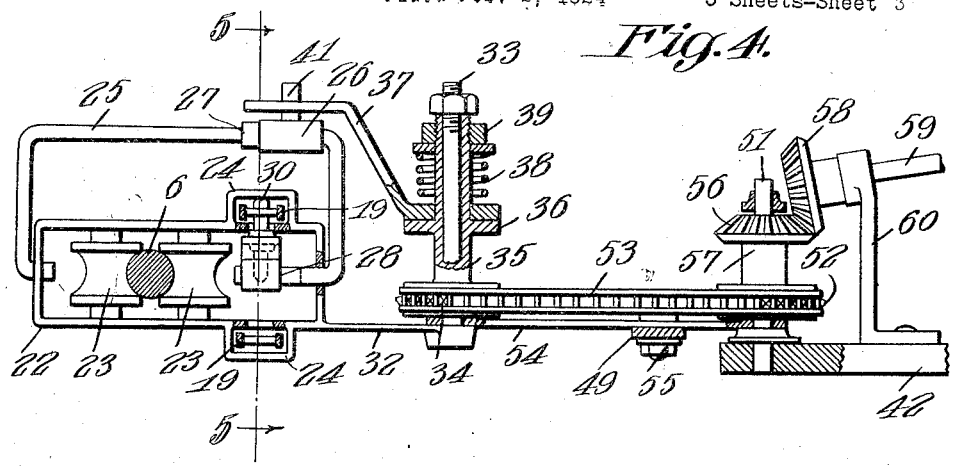
Figure 4 is a sectional view wherein the carriage and a portion of the vehicle appear, most parts being in elevation.

A loop-shaped carriage 22 is mounted to slide along each arm or spoke 6, the carriage being provided with grooved wheels 23, located within the carriage and cooperating with the arm 6. The carriage 22 is supplied with upper and lower guides 24, receiving the upper and lower runs of the sprocket chain 19 slidably. Bail-shaped levers 25 are pivoted to the carriage 22 and project above the carriage, the levers extending transversely of the arm 6 of the rotary member 2, as shown in Figures 2 and 4. The ends of a link 26 are mounted pivotally on the upper ends of the levers 25, the link being held in place by collars 27 on the upper portions of the levers 25. The inner lower end (Figure 4) of one lever 25 carries a dog 28 (Figure 5) operating within the carriage 22 and comprising an arm 29 (Figures 5 and 6) and a cross pin 30, the ends of the pin 30 being adapted to move through openings 31 formed in the top and the bottom of the carriage 22.

The carriage 22 has an extension 32 supporting a vertical shaft 33 whereon a sprocket wheel 34 is journaled, the sprocket wheel having a tubular hub 35 provided with a friction disk 36. An arm 37 surrounds the upper portion of the hub 35 and rests at one end on the disk 36. A strong compression spring 38 surrounds the upper portion of the hub 35 and is interposed between one end of the arm 37 and an adjustable abutment 39 on the hub 35, the abutment being in the form of a nut and washer, if desired, the spring 38 being strong enough so that, ordinarily, the arm 37 will swing horizontally when the sprocket wheel 34 is rotated although, under conditions to be pointed out hereinafter, the arm 37 may swing independently of the sprocket wheel 34, on the hub 35, in engagement with the disk 36, the spring 38 and the disk 36 constituting a friction clutch connecting the arm 37 operatively with the sprocket wheel 34. In its forward end, the arm 37 has a fork 40, receiving pivotally, a stud 41 which projects upwardly from the link 26 that connects the levers 25 which are mounted pivotally on the carriage 22.

The numeral 42 designates a vehicle mounted to roll along the platform or track 11. The vehicle 42 comprises a rear axle 43 whereon wheels 44 are journaled. The vehicle has a front axle 45 whereunto angular stub axles 46 are pivoted at 47, the stub axles carrying forward wheels 48 which, like the wheels 44, roll on the platform or track 11. A drag-link 49 is pivoted at 50 to the forward ends of the angular stub axles 46. A shaft 51 is mounted on the forward end of the vehicle 42, and on a shaft is journaled a sprocket wheel 52, a sprocket chain 53 being engaged about the sprocket wheel 52 of the vehicle 42 and about the sprocket wheel 34 which is journaled on the carriage 22. A connection or tongue 54 is located below the sprocket wheels 34 and 52 and is mounted pivotally on the shaft 33 of the carriage 22 and on the shaft 51 of the vehicle 42. The intermediate portion of the drag-link 49 is pivoted at 55 to the intermediate portion of the connection or tongue 54. A beveled gear 56 is connected at 57 with the sprocket wheel 52 to rotate therewith. The beveled gear 56 meshes with a beveled gear 58 on a steering shaft 59 supported at 60 for rotation on the vehicle 42, the rear end of the shaft 59 carrying a steering wheel 61 which is accessible from the drivers seat 62 of the vehicle.

Figure 5:
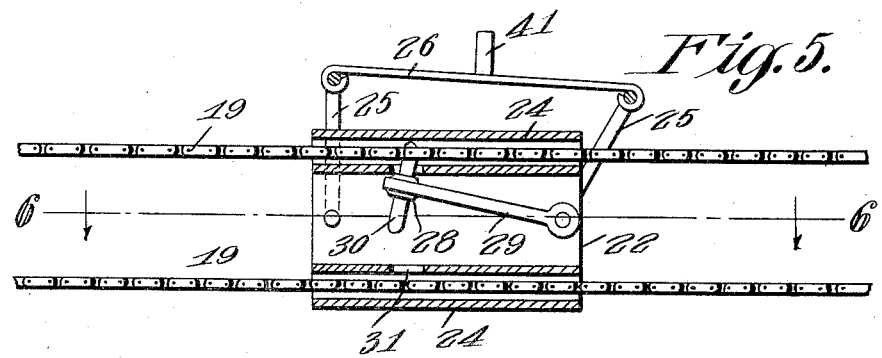
Figure 5 is a section on the line 5—5 of Figure 4.
Figure 6:
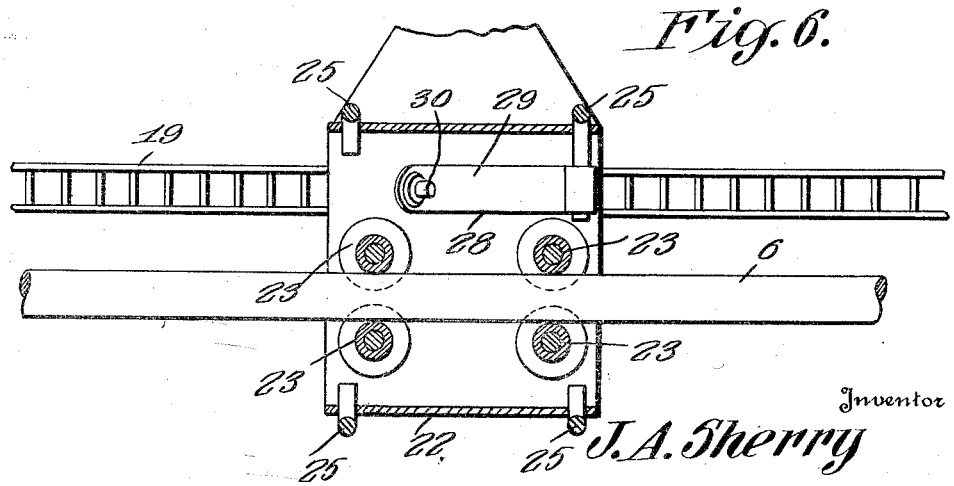
Figure 6 is a section on the line 6—6 of Figure 5.

In practical operation, the wheels 10 of the rotary member 2 are turned, by engagement with the track 11, when the member 2 is rotated about the post 1. Each wheel 10 drives the corresponding sprocket wheel 16 through the instrumentality of the beveled pinions 12 and 14, motion being imparted to the sprocket chain 19, the sprocket wheel 18 constituting an idle support for the sprocket chain 19. The occupant of the vehicle 42 rotates the steering shaft 59 by way of the wheel 61, and the beveled gears 58 and 56 rotate the sprocket wheel 52, the chain 53 rotating the sprocket wheel 34 and causing the arm 37 to swing, motion being imparted to the link 26 by way of the stud 41 on the link. The levers 25 are tilted, and the upper end of the pin 30 of the dog 28 is brought into engagement with the upper run of the sprocket chain 19, as shown in Figure 5—or, by a reverse rotation of the steering wheel 61, the lower end of the cross pin of the dog may be brought into engagement with the lower run of the sprocket chain. The carriage 22, thus, may be connected with either the upper run of the sprocket chain or with the lower run of the sprocket chain, and, through the instrumentality of the chain, the carriage 22 may be caused to reciprocate on the arm 6. When the upper portions of the respective levers 25 engage the shifting members 20 and 21 on the arm 6, the levers 25 are swung, motion being transmitted from lever to lever, by way of the link 26, and the cross pin 30 of the dog 28 being shifted from one run of the chain 19 to the other, to secure a reciprocation of the carriage 22 on the arm 6, the vehicle 42 following the carriage. When the carriage 22 starts to move along the arm 6, responsive to the chain 19, the tongue 54 is swung, and the tongue, being pivoted at 55 to the drag link 49, tilts the stub axles 46 on their pivotal mountings 47 and so inclines the wheels 48 that the vehicle 42 will tend to move in the direction in which the carriage 22 is moving along the arm 6. By a proper manipulation of the steering wheel 61, the dog 28 may be so located that the cross pin 30 engages neither the upper run nor the lower run of the sprocket chain 19, and, then, the carriage 22 will remain at rest on the arm 6. The carriage 22 may be located by the occupant of the vehicle 42, at any point along the arm 6, and, in this way, the distance of the vehicle 42, from the post 1 may be varied, the driver of the vehicle being given a "slow ride" and a "fast ride" as his taste may dictate. It may happen that the occupant of the vehicle through excitement or otherwise, will grip and hold the steering wheel 61 when the carriage 22 arrives adjacent to the shifting elements 20 and 21. When the driver grips the steering wheel 61, the sprocket wheel 34 is held against rotation, but this circumstance will not prevent the parts 20 and 21 from swinging the levers 25 and reversing the position of the cross pin 30 of the dog 28 with respect to the upper and lower runs of the sprocket chain 19, because the rear end of the arm 37 can slip on the friction disk 36, notwithstanding the pressure exerted on the rear end of the arm 37 by the spring 38.

The form above described is adapted to be operated by persons having but little strength, it being observed that the rotation of the steering wheel 61 merely shifts the dog 28 between the runs of the sprocket chain 19, the lateral movement of the vehicle 42 being brought about when the carriage 22 moves responsive to the chain 19, the tongue 54 being tilted at 55 to operate the drag-link 49 and to turn the wheels 48 of the vehicle in the proper direction.

Passing to the form which is shown in Figures 7 and 8, the arm of the rotary member, corresponding to the arm 6, is marked by the numeral 63 and has a rack 64. The carriage 65 has hook-shaped brackets 66 engaged about the track 63 and carrying wheels 67 adapted to cooperate with the arm. A shaft 68 is journaled in the carriage 65 and is provided with a pinion 69, meshing into the rack 64 of the arm 63. The shaft 68 has a sprocket wheel 70. The vehicle is shown at 71 and the steering shaft appears at 72, the shaft 72 being connected by beveled pinions 73 with a vertical shaft 74 journaled in the forward portion of the vehicle 71, and carrying, below the platform of the vehicle, a sprocket wheel 75, a chain 76 being engaged about the sprocket wheels 75 and 70. A tongue or connection 77 is mounted pivotally on the shafts 68 and 74 and is pivoted intermediate its ends, as at 78, to a drag-link 79 pivoted at 80 to the forward ends of angular stub axles 81 pivoted at 82 to the forward axle 83 of the vehicle 71, and carrying wheels 84.

When the steering shaft 72 is rotated, the pinions 73 rotate the shaft 74, the shaft 68 being rotated by the sprocket wheels 75 and 70 and the chain 76. When the shaft 68 is rotated, the pinion 69 is rotated, and, cooperating with the rack 64, moves the carriage 65 inwardly or outwardly along the arm 63. This form of the invention requires more effort on the part of the operator than does the form shown in Figure 2, because it is by the effort of the operator that the carriage 65 is moved, the effort of the operator also, bringing about a swinging of the tongue 77, the tongue turning the forward wheels 84 on the stub axles 81, in the proper direction, through the medium of the drag-link 79.

Figure 9:
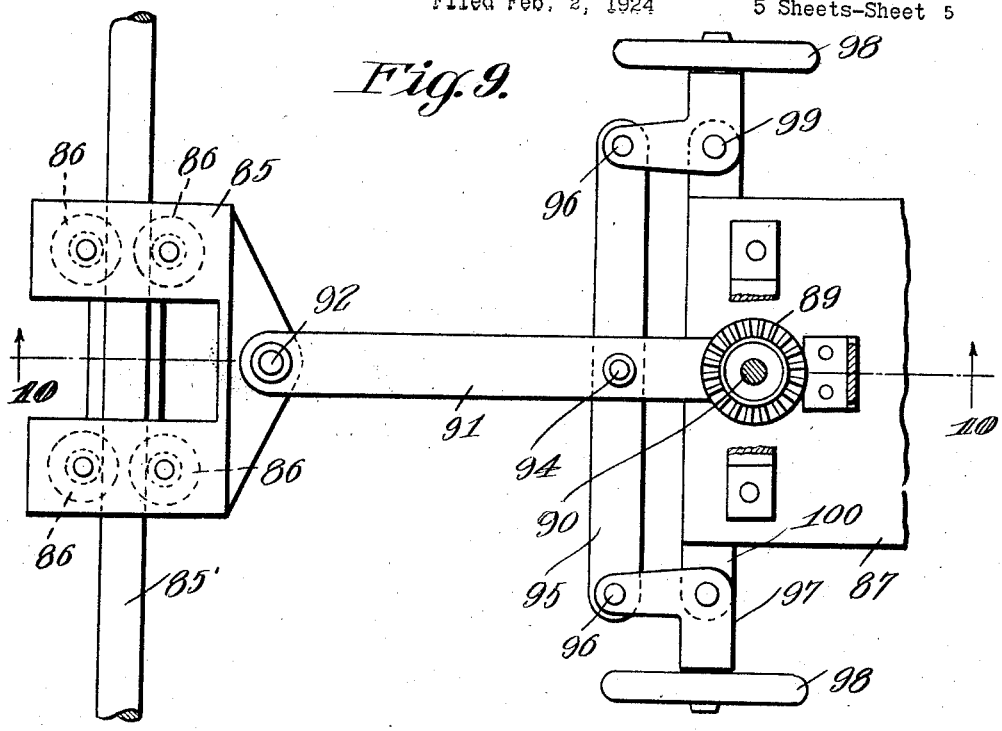
Figure 9 is a plan disclosing another modification.
Figure 10:
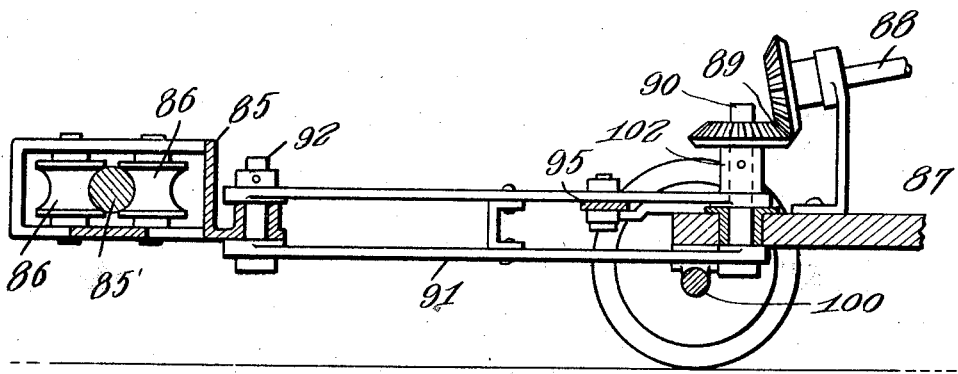
Figure 10 is a section on the line 10—10 of Figure 9.

In the form shown in Figures 9 and 10, the arm, corresponding to the arm 6 of Figure 2, is designated by the numeral 85'. The carriage which slides along the arm, is designated by the numeral 85 and carries grooved wheels 86 cooperating with the arm 85'. The vehicle is shown at 87 and the steering shaft at 88, the shaft 88 being connected by beveled pinions 89 with a vertical shaft 90 journaled on the forward portion of the vehicle. A two-part tongue or connection 91 is pivoted at 92 to the rear end of the carriage 85. The upper member of the tongue 91 is connected by a sleeve 102 with that one of the beveled pinions 89 which is secured to the shaft 90, whereas the lower member of the tongue 91 is secured to the lower end of the shaft 90. The intermediate portion of the upper member of the tongue 91 is pivoted at 94 to a drag-link 95 which is pivoted at 96 to angular stub axles 97 carrying wheels 98, the stub axles being pivoted at 99 to the main axle 100 of the vehicle 87.

In the operation of the form shown in Figures 9 and 10, the operator rotates the steering shaft 88 and the pinions 89 rotate the shaft 90, the tongue 91 being swung, and the carriage 85 being moved a short distance along the arm 85', to one side of the longitudinal center of the vehicle 87. At the same time, the tongue 91, the drag-link 95 and the stub axles 97 turn the wheels 98 in such a direction that the vehicle tends to follow the carriage 85 as the carriage reciprocates on the arm 85'. When the wheels 98 are inclined in the direction of the arrow A in Figure 9, the carriage 85 slides in a corresponding direction on the arm 85', and when the wheels 98 are inclined in an opposite direction, the carriage 85 is caused to slide on the arm 85' in a corresponding direction, the movement of the carriage 85 and the vehicle 87 radially of the rotary member (of which the arm 85' constitutes a part) being brought about by changing the position of the wheels 98, that is, by inclining them inwardly or outwardly. This form of the invention calls for more skill in operation than does the form shown in Figure 2 and, by reversing the direction of rotation of the steering shaft 88, the operator can reverse the direction of sliding movement of the carriage 85 on the arm 85' and produce a "whip" effect. In this form of the invention, the carriage 85 may be cushioned, at the ends of its stroke on the arm 85, by spring buffers 103 on the arm 85'.

I claim:

1. In a device of the class described, a vehicle, a carriage, means for connecting the vehicle pivotally with the carriage, a rotary member, means for mounting the carriage on the rotary member for sliding movement in a direction substantially radially of the rotary member, thereby to vary the distance between the vehicle and the center of rotation of the rotary member and to change the speed at which the vehicle moves in an orbit, and means for holding the carriage at adjusted distances from the axis of rotation of the rotary member, said holding means comprising an operating part accessible to an occupant of the vehicle.

2. In a device of the class described, a rotary member, a carriage mounted for reciprocation on the rotary member substantially radially thereof, a vehicle, means for connecting the vehicle pivotally with the carriage; and means for securing a reciprocation of the carriage on the rotary member, said means comprising a part on the vehicle and under the control of an operator.

3. In a device of the class described, a rotary member, a carriage mounted for reciprocation on the rotary member substantially radially thereof, a vehicle; and means for securing a reciprocation of the carriage on the rotary member, said means comprising a tongue pivoted to the carriage and to the vehicle, stub axles pivoted on the vehicle, wheels carried by the axles, and a drag link pivoted to the axles, the link and the tongue being pivotally connected intermediate their ends.

4. In a device of the class described, a rotary member having a track-engaging wheel, a carriage mounted for reciprocation on the rotary member substantially radially thereof, a vehicle, means for pivotally connecting the vehicle with the carriage and means driven by the wheel for causing the carriage to reciprocate on the rotary member.

5. In a device of the class described, a rotary member having a track-engaging wheel, a carriage mounted for reciprocation on the rotary member substantially radially thereof, a vehicle, means for pivotally connecting the vehicle with the carriage, means driven by the wheel for causing the carriage to reciprocate on the rotary member, and mechanism for coupling the carriage to the last specified means and for uncoupling the carriage therefrom and a device for operating said mechanism and comprising a part under the control of an operator and located on the vehicle.

6. In a device of the class described, a rotary member having a track-engaging wheel, a carriage mounted for reciprocation on the rotary member substantially radially thereof, a vehicle, means for pivotally connecting the vehicle with the carriage, means driven by the wheel for causing the carriage to reciprocate on the rotary member, mechanism for coupling the carriage to the last-specified means and for uncoupling the carriage therefrom, and devices on the rotary member for operating said mechanism when the carriage approaches the limits of its travel on the rotary member.

7. In a device of the class described, a rotary member having a track-engaging wheel, a carriage mounted for reciprocation on the rotary member substantially radially thereof, a vehicle, means for pivotally connecting the vehicle to the carriage, means driven by the wheel for causing the carriage to reciprocate on the rotary member, mechanism for coupling the carriage to the last specified means and for uncoupling the carriage therefrom, a device for operating said mechanism and comprising a part under the control of an operator and located on the vehicle, and devices on the rotary member for operating said mechanism when the carriage approaches the limits of its travel on the rotary member.

8. In a device of the class described, a turntable having a track-engaging wheel, an endless member movable on the turntable substantially radially thereof, the endless member comprising oppositely moving runs, a reciprocating carriage movable on the turntable, a latch mechanism on the carriage and movable to connect either run of the endless member with the carriage, a vehicle connected to the carriage, and means for shifting the latch mechanism with respect to the runs of the movable member.

9. A device of the class described, constructed as set forth in claim 8, and further characterized by the fact that said means embodies spaced shifting members mounted in the turntable at points adjacent to the ends of the path traversed by the carriage as it reciprocates.

10. A device of the class described, constructed as set forth in claim 8, and further characterized by the fact that said means embodies as part under the control of an operator and located on the carriage.

11. A device of the class described, constructed as set forth in claim 8, and further characterized by the fact that said means comprises spaced shifting members mounted on the turntable at points adjacent to the ends of the path traversed by the carriage as it reciprocates, and embodies, also, a part under the control of an operator and located on the vehicle.

12. A device of the class described, comprising a turntable having a track-engaging wheel, an endless member movable on the turntable substantially radially thereof and including oppositely moving runs, a reciprocating carriage movable on the turntable, a vehicle connected to the carriage, a latch mechanism on the carriage and movable to connect either run of the movable member with the carriage, means for shifting the latch mechanism with respect to the runs of the movable member when the carriage arrives at points adjacent to the ends of its travel on the turntable; a device for connecting the movable member with the wheel, and a device located partly on the carriage for shifting the latch mechanism with respect to the runs of the movable member, one of the last-specified devices embodying a slip-clutch, permitting said means to function when the last-specified one of said devices is held, by an occupant of the vehicle, against movement.

13. In a device of the class described, a turntable having a track-engaging wheel, a reciprocating carriage movable on the turntable substantially radially thereof, a vehicle connected to the carriage, mechanism for reciprocating the carriage on the turntable, latch means for connecting the carriage to said mechanism, means on the turntable for shifting the latch means with respect to said mechanism when the carriage arrives at points adjacent to the ends of its travel on the turntable; a device for operatively connecting the wheel with said mechanism, and a device for shifting the latch means from the vehicle, one of said devices embodying a slip-clutch.

In testimony that I claim the foregoing as my own I have hereto affixed my signature.

JAMES A. SHERRY.